United States Patent [19]

Yanagisawa

[11] Patent Number: 5,130,715
[45] Date of Patent: Jul. 14, 1992

[54] METHOD OF MANAGING BEAMS FORMED BY PHASED ARRAY ANTENNAS AND APPARATUS THEREFOR

[75] Inventor: Hajime Yanagisawa, Kanagawa, Japan

[73] Assignee: Mitsubishi Denki Kabushiki Kaisha, Japan

[21] Appl. No.: 647,582

[22] Filed: Jan. 29, 1991

[30] Foreign Application Priority Data

Jan. 30, 1990 [JP] Japan .................................. 2-19598

[51] Int. Cl.$^5$ ............................................. G01S 13/66
[52] U.S. Cl. .................................... 342/158; 342/81; 342/96
[58] Field of Search ................... 342/158, 96, 195, 81, 342/88

[56] References Cited

U.S. PATENT DOCUMENTS 4,720,711  1/1988  Quesinberry et al. ................ 342/96
4,724,438  2/1988  Arnold et al. ................... 372/195 Y

OTHER PUBLICATIONS

Farina et al, "Multitarget Interleaved Tracking for Phased-Array Radar", IEEE PROC vol. 127, Pt. F., No. 4, Aug. 80 pp. 312-318.

Billeter, "Efficient Radar Control", Microwave Journal, Jan. 1986, pp. 147-157.

Mulle, "A Radar Phased Array Primer", RCA Engineer, 31-5, Sep. 1986, pp. 70-76.

Primary Examiner—Gilberto Barron, Jr.
Attorney, Agent, or Firm—Wolf, Greenfield & Sacks

[57] ABSTRACT

A method of managing beams transmitted and received by a plurality of phased array antennas. In a search mode, the phased array antennas transmit searching pulses synchronously in a search mode. In a tracking mode, targets tracked by the phased array antennas are divided to a plurality of groups on the basis of pulsed repetition rate. Then, for the respective divided groups, transmission timings of tracking pulses to be sent form the phased array antennas are calculated by using ranges of the targets belonging to the respective groups so that transmission and reception operations do not occur simultaneously, thereby enabling the simultaneous usage of the phased array antennas.

10 Claims, 7 Drawing Sheets

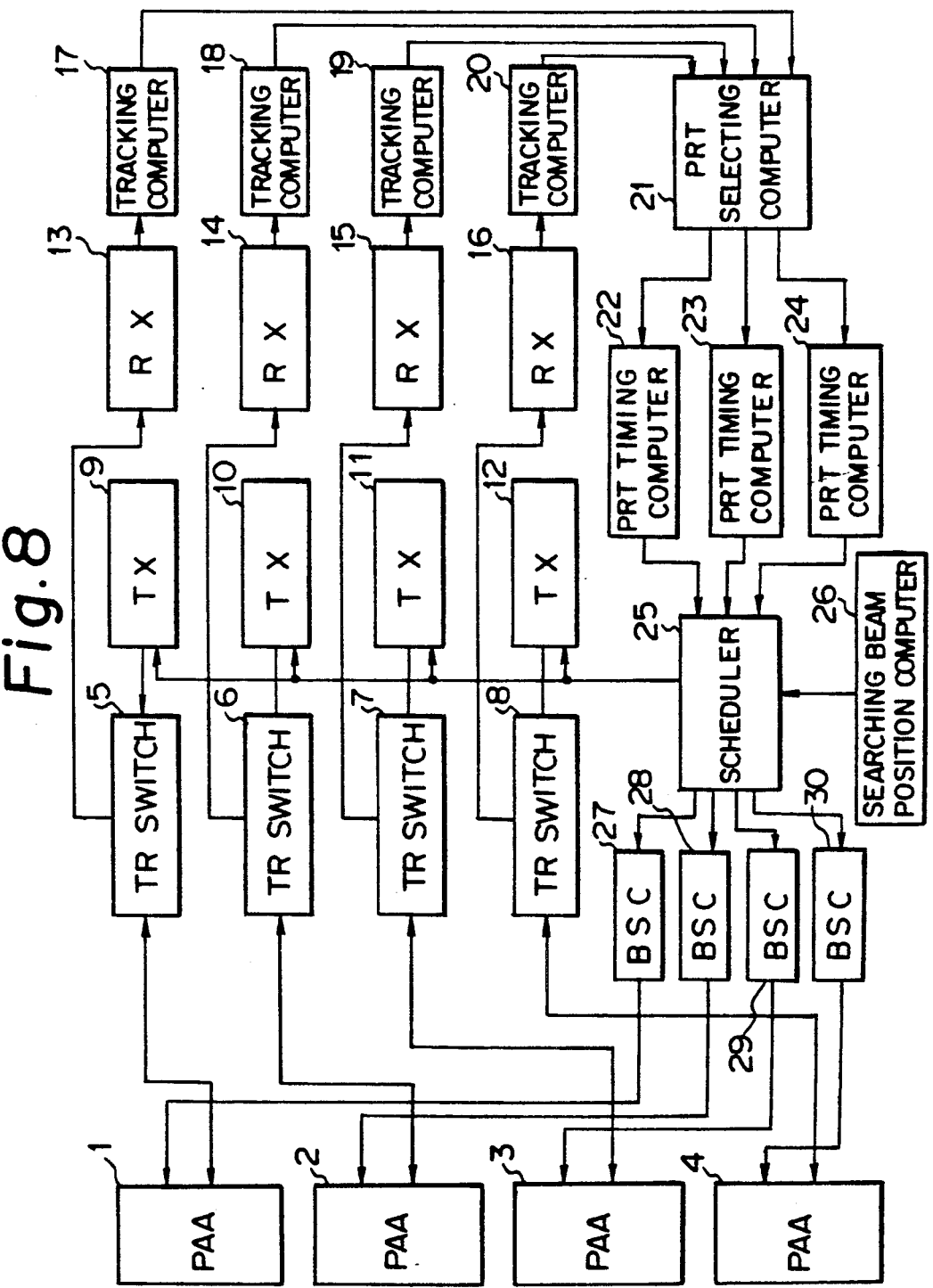

METHOD OF MANAGING BEAMS FORMED BY PHASED ARRAY ANTENNAS AND APPARATUS THEREFOR

BACKGROUND OF THE INVENTION

1. Field of the Invention

The present invention relates to a beam management method enabling simultaneous beam forming by a multi-functional phased array radar including a plurlity of phased array antennas (PAAs) disposed adjacent from one another in order to search and track targets while avoiding mutual interference between the phased array antennas, and an apparatus therefor.

2. Prior Art

FIG. 1 is a block diagram showing a beam management method of the prior art (See, for example, W. A. Mulle, "A radar/phased array radar primer" in RCA Engineer 31-5, September/October/November 1986, pages 68-76). In a step 102 of the managing method, various parameters of the targets being tracked by the respective PAAs are temporarily stored. In a step 104, the positions of searching beams are calculated, and in a step 106, timings of transmission of searching beams are assigned to the respective PAAs so as to ensure predetermined periods of search time. In a step 108, timings to radiate tracking beams are assigned to the respective PAAs on the basis of the stored parameters of the targets. In order that the timings of the searching beams do not overlap those of the tracking beams, and that the searching or tracking operation performed by the same PAA are not repeated, scheduling is conducted for a $PAA_j$ ($1 \leq j \leq N$) in a step 110. A beam scan calculator (BSC) is driven for the $PAA_j$ to provide the $PAA_j$ with a necessary amount of phase shift to cause a beam to be formed in a step 112. Then a comparison is made between j and N in a step 114. If j is smaller than N, after an echo is received, the value of j is incremented by one in a step 116 ($j=i+1$). Similar procedures are taken until j becomes equal to N, and the procedure returned to the step 106.

Such timings for searching and tracking operations are time-division-multiplexed, as shown in FIG. 2. For example, the PAA 1 is operated in the search mode followed by the tracking operations by PAAs 1–4 in this order. Next, the PAA 2 is operated in the search mode and tracking operations by the PAAs 1–4 then follow in this order, and so on.

FIG. 3 is a block diagram showing the construction of a phased array radar system of the prior art, as described in the above-identified article by Mulle. Phased array radars generally have a plurality of PAAs, and this figure shows, the most common number, four, PAAs. In FIG. 3, the prior art system comprises four PAAs 120, 122, 124 and 126 each conducting searching and tracking operations in different one-quarter portions of a hemispherical range, and an antenna selector 128 for selecting one of the four PAAs. A TR switch 130 follows the antenna selector 128 to switch between a transmitter 132 and a receiver 134.

A tracking computer 136 is connected to the receiver 134 for tracking a target on the basis of a signal received from the receiver and calculating target parameters. A searching beam position computer 140 is provided for calculating a searching beam position. A BSC 142 operates to calculate amounts of phase shift to be set to the PAAs 120–126. A scheduler 144 is positioned between the BSC and the tracking computer 136 and the searching beam position computer 140 for allotting beam radiating timings of searching and target tracking operations to the PAAs and driving the BSC in accordance with the calculated timings.

In such a radar system, the respective PAAs radiate beams in a time-division-multiplexing manner as shown in FIG. 2.

It is essentially necessary to avoid any mutual interference between a plurality of PAAs closely disposed to each other. To do this, it is advisable to employ what is called a "synchronization system" wherein all the PAAs repeatedly transmit, at the same time, pulses having the same pulse width at the same pulse repetition rate (hereinafter called "PRT") so that the transmission by one PAA does not overlap the reception by another PAA.

As for target tracking, however, because a range, a desired clutter suppression ratio and so on are different for each target, the width of transmitted pulses and the PRTs have to be different. (There are, for example, long, medium and short PRTs.) Consequently, it is impossible to employ the synchronization system.

As a result, in the prior art radar system, the searching and tracking beams have to be radiated from the respective PAAs in such a time-division-multiplexed manner as shown in FIG. 2. This causes a significant amount of time to be taken to complete the searching operations, to detect targets in a predetermined area. Conversely, if a short period of time is present for searching targets in a predetermined area, the number of targets to be tracked is significantly reduced.

SUMMARY OF THE INVENTION

The present invention has been made to solve such problems as described above.

An object of the invention is to provide a beam management method which enables simultaneous searching and tracking operations to be performed by respective PAAs to obtain an excellent radar performance about N times higher than that of a prior art phased array radar, N being the number of the PAAs, and a phased array radar system thereof.

In order to accomplish the above described objects, the present invention provides a method of managing beams transmitted and received by a radar comprising a plurality of phased array antenna apparatuses. The method comprises the steps of:

in a search mode, causing the phased array antenna apparatuses to form searching beams synchronously to thereby avoid mutual electrical wave interference between the phased array antenna apparatuses; and in a tracking mode, dividing targets tracked by the phased array antenna apparatuses to a plurality of groups on the basis of pulse repetition rate, and then calculating, for the respective divided groups, transmission timings of tracking pulses to be sent from the phased array antenna apparatuses using ranges of the targets belonging to the respective groups so that one phased array antenna apparatus does not transmit the tracking pulse at the time when another phased array antenna apparatus is in a receiving operation, thereby avoiding interference between the phased array antenna apparatuses and enabling the simultaneous usage thereof.

More specifically, the method according to the present invention comprises the steps of:

(1) in a search mode, (a) transmitting pulses having the same characteristic from the respective phased array antenna apparatuses in the radar simultaneously, and (b) receiving echoes from the targets by the phased array antenna apparatuses;

(2) then, in a tracking mode, (a) analyzing parameters of the targets from the received echoes; (b) dividing targets tracked by the phased array antenna apparatuses to groups on the basis of at least one of the analyzed parameters; (c) allotting transmission timings to the phased array antenna apparatuses tracking the targets belonging to any one of the divided groups by using the ranges of the targets of that group so that transmitting and receiving operations do not occur at the same time in the phased array antenna apparatuses corresponding to that group; and (d) driving the phased array antenna apparatuses corresponding to that group in accordance with the allotted timings; and (3) repeating the steps of (1) and (2).

In this method, the same characteristic may be a pulse width and a pulse repetition rate, and at least one of the analyzed parameters may be a pulse repetition rate.

The step (2) may further comprise, between the steps of (c) and (d), the steps of:

(e) calculating positions of the searching beams to be radiated from the respective phased array antenna apparatuses; and (f) allotting timings for transmitting the searching and the tracking pulses to the respective phased array antennas.

The present invention also provides a radar system for searching and tracking targets, comprising:

a plurality of phased array antennas disposed closely;

transmitting means provided in correspondence to the phased array antennas;

receiving means provided in correspondence to the phased array antennas for receiving echo signals from the searched targets to analyze parameters of the targets from the received echo signals;

a first means responsive to the analyzed parameters for dividing the targets to a plurality of groups on the basis of at least one of the analyzed parameters;

a second means for allotting, for each divided group, transmission timings of tracking pulses to the phased array antennas corresponding to that group using the ranges of the targets belonging to that group so that transmitting and receiving operations do not occur at the same time in that group;

a third means for causing the transmitting means to transmit searching pulses having the same characteristic at the same time in the search mode and for causing the transmitting means to transmit tracking pulses in response to the allotted transmission timings in the tracking mode; and a fourth means responsive to the third means for causing the phased array antennas to form searching and tracking beams at predetermined directions.

According to an embodiment of the present invention, a multifunction phased array radar including a plurality of closely disposed phased array antennas for performing searching and tracking targets comprises:

transmitters provided in correspondence to the phased array antennas for transmitting searching and tracking pulses;

receivers provided in correspondence to the phased array antennas to receive echo signals from the targets;

tracking computing means responsive to the corresponding receivers for analyzing parameters of the targets tracked by the phased array antennas on the basis of the received echo signals;

a grouping computing means responsive to the tracking computing means for dividing the targets to a plurality of groups on the basis of pulse repetition rates;

timing computing means provided in correspondence to the respective divided groups to compute transmission timings to send the tracking pulses from the transmitters, using ranges of the targets belonging to the respective groups, so that transmitting and receiving operations do not occur at the same time in the phased array antennas corresponding to any one of the divided groups;

a position computing means for computing the positions of the searching beams to be formed by the respective phased array antennas in the search mode;

a scheduler means responsive to the timing computing means and the position computing means for causing the transmitters to operate to send the searching pulses simultaneously in the search mode and for causing the transmitters corresponding to the respective groups to operate to send the tracking pulses at the timings determined by the corresponding timing computing means and in the order of the groups; and beam scanning computing means provided in correspondence to the divided groups for causing the phased array antennas corresponding to the respective groups to form beam in predetermined directions.

According to the present invention, a plurality of phased array antennas can be operated simultaneously in the search and the tracking modes, and it may be possible to improve the performance of a radar almost N (the number of phased array antennas) times better than the prior art.

These and other objects and advantages of the present invention will become more apparent from the following description taken in connection with the accompanying drawings.

BRIEF DESCRIPTION OF THE DRAWINGS

FIG. 8 is a block diagram schematically showing the construction of a phased array radar according to the present invention.

DETAILED DESCRIPTION OF THE PREFERRED EMBODIMENTS

Figure 1:
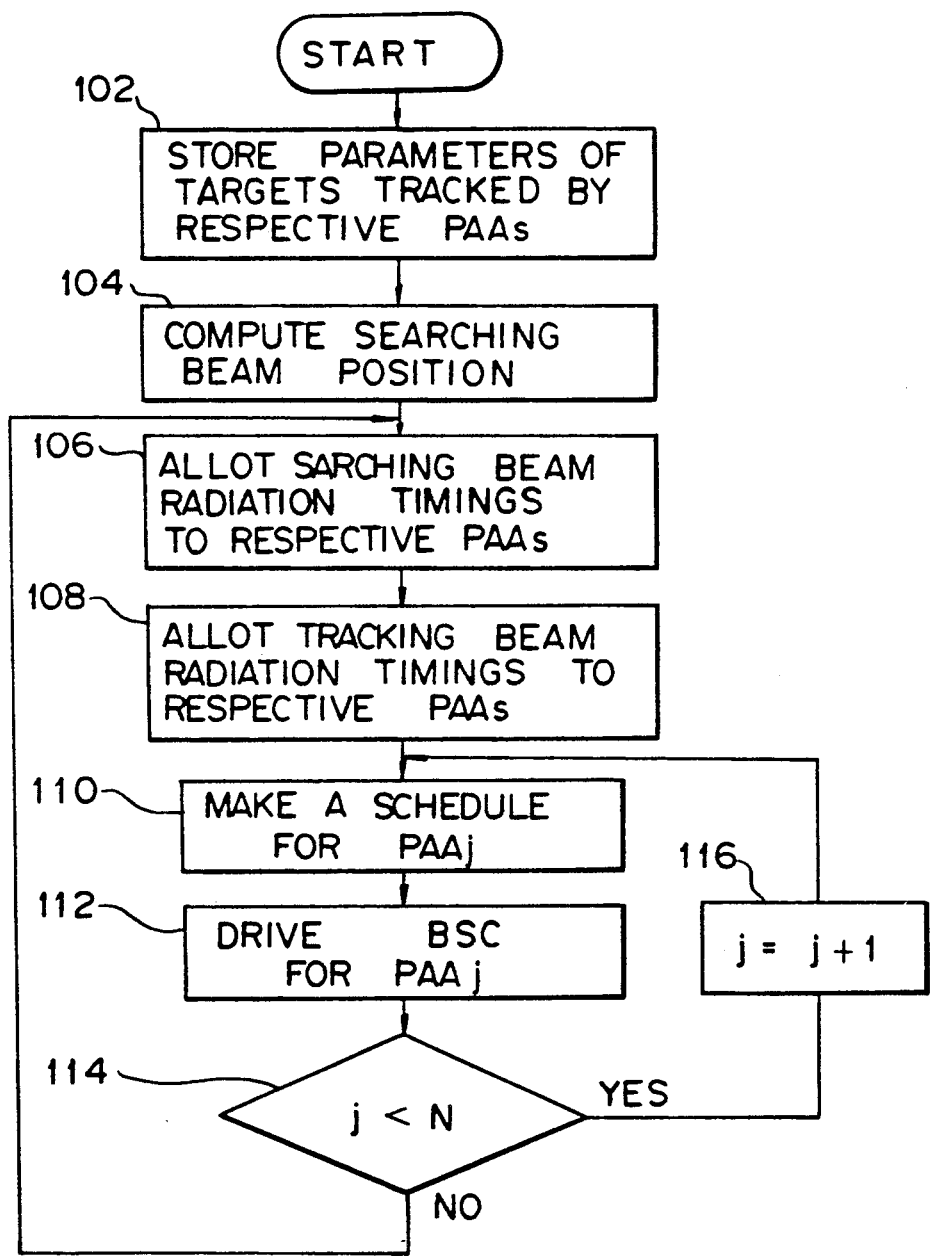
FIG. 1 is a flow chart showing an example of a process for managing beams radiated from a phased array radar of the prior art.
Figure 2:
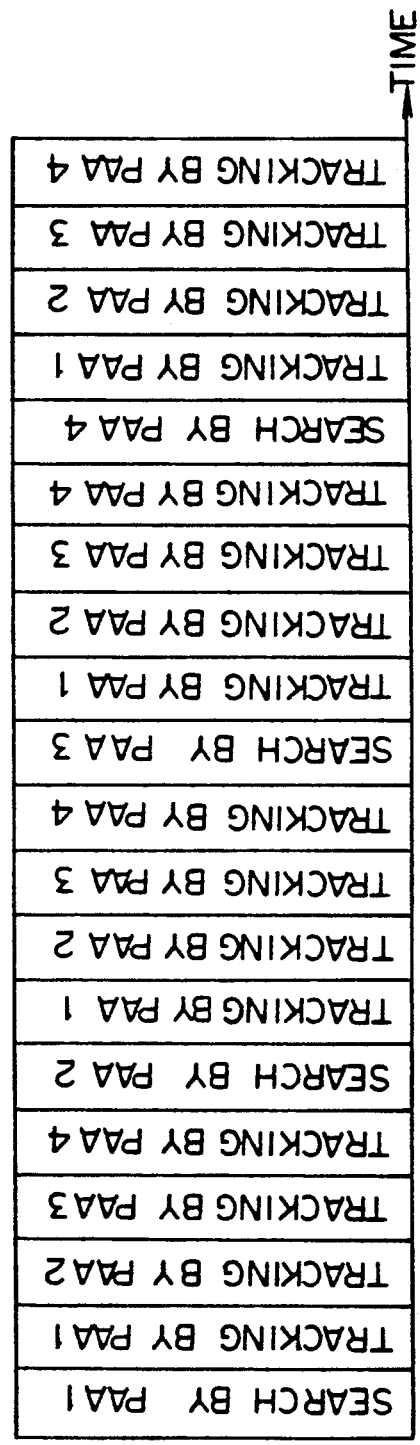
FIG. 2 is used to explain how searching and tracking operations are arranged in time in the phased array radar of the prior art.
Figure 3:
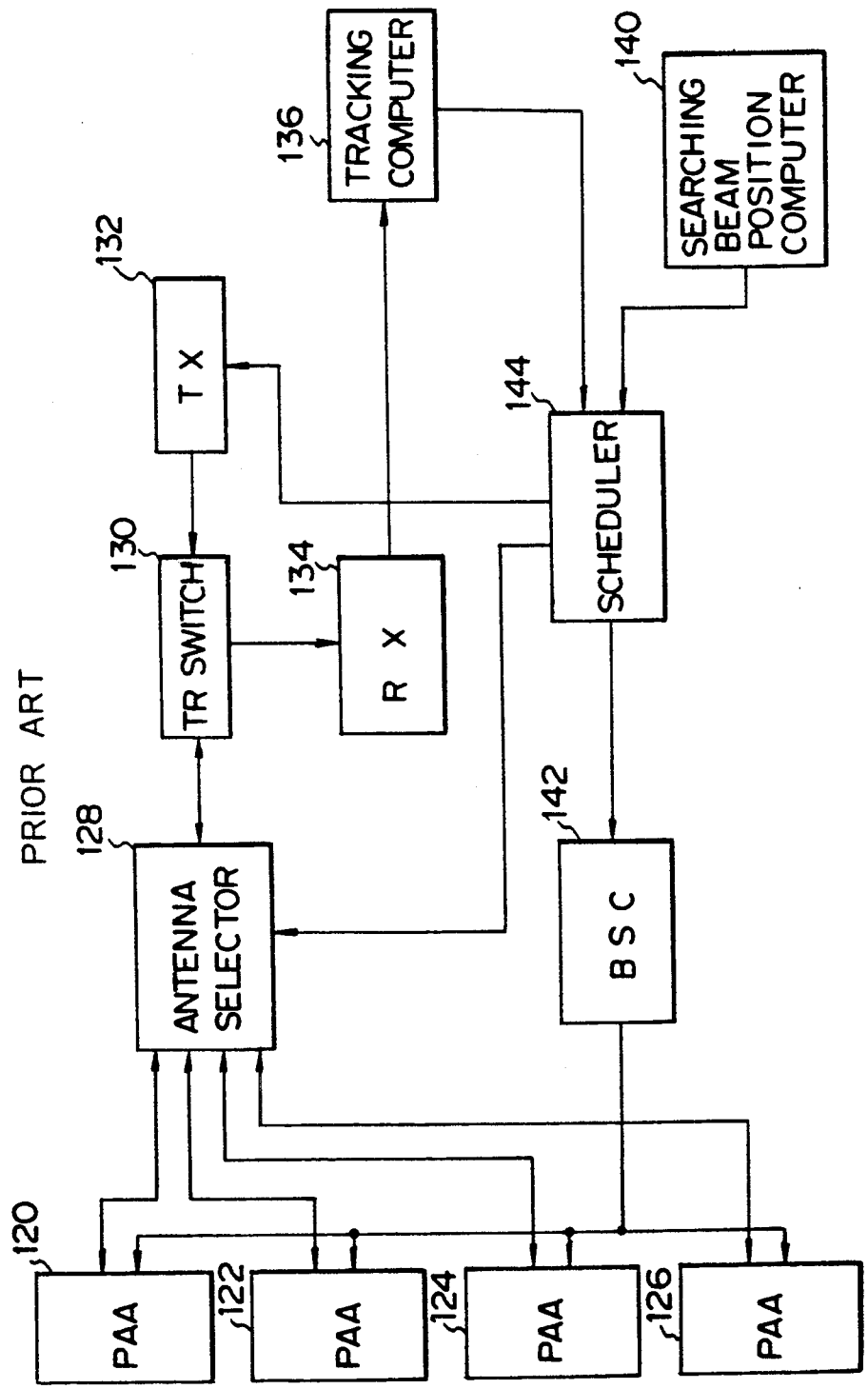
FIG. 3 is a block diagram schematically showing the construction of a phased array radar of the prior art.
Figure 4:
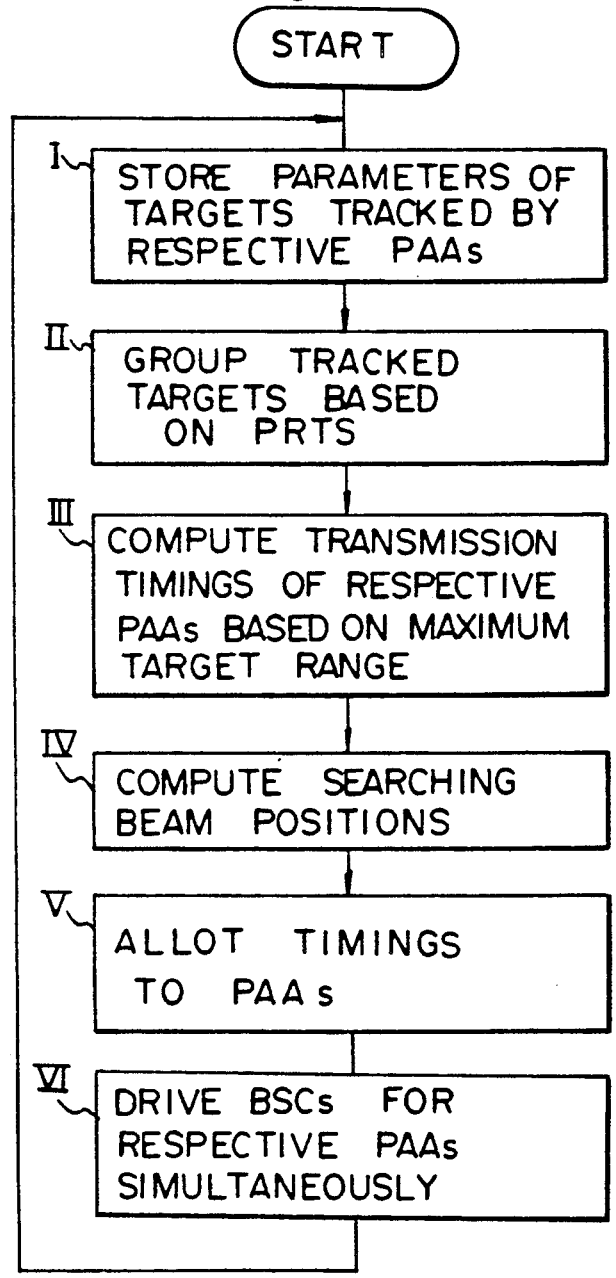
FIG. 4 is a flow chart presented for explaining a basic concept of the steps of a beam management method according to the present invention.

FIG. 4 is a flow chart showing a general concept of a beam management method according to the present invention wherein a phased array radar comprises a plurality of PAAs closely disposed. In this method, the respective PAAs radiate, at the same time, searching beams having the same pulse width and pulse repetition rate in the search mode. Then, in the tracking mode, in a step I, parameters of targets tracked by a plurality of PAAs are stored. In a step II, the tracked targets are divided into groups on the basis of different PRTs. In a step III, transmission timings are calculated for the respective PAAs using the maximum target range as a standard. In a step IV, searching beam positions are determined in the same manner as in the prior art. In a step V, a time arrangement for searching and tracking operatins is determined. In a step VI, BSCs for the respective PAAs are driven simultaneously.

The beam management method according to the present invention will more specifically be described hereinafter. In the step I, the parameters of targets being tracked by a plurality of PAAs (range, transmission pulse width, PRT and the like) are input from tracking computers corresponding to the respective PAAs and are stored therein. In the step II, the tracked targets are grouped in accordance with different PRTs such that the targets having the same PRT are included in the same group. For example, the targets can be divided into three groups, that is, a first group corresponding to a long PRT, a second group corresponding to a medium PRT and a third group corresponding to a short PRT.

In the step III, the transmission timings for the respective PAAs which keep track of the targets belonging to the same group are calculated on the basis of the maximum range detected from a target tracked by a PAA of that group and using the ranges of the respective targets. Assuming that four PAAs denoted as PAA1, PAA2, PAA3 and PAA4 are included in one same group, and that the target tracked by the PAA1 has maximum range, the transmission timings for these PAAs are determined as follows:

$$\Delta t_2 = 2(R_1 - R_2)/C$$

$$\Delta t_3 = 2(R_1 - R_3)/C$$

$$\Delta t_4 = 2(R_1 - R_4)/C$$

where $\Delta t_2$ is a delay of transmission of the PAA2 from the time the PAA1 has transmitted a signal; $\Delta t_3$ is a delay of transmission of the PAA3 from the time the PAA1 has transmitted a signal; $\Delta t_4$ is a delay of transmission of the PAA4 from the time the PAA1 has transmitted a signal;

$R_1$: a range of the target tracked by the PAA1;
$R_2$: a range of the target tracked by the PAA2;
$R_3$: a range of the target tracked by the PAA3;
$R_4$: a range of the target tracked by the PAA4;
C: velocity of light.

Figure 5:
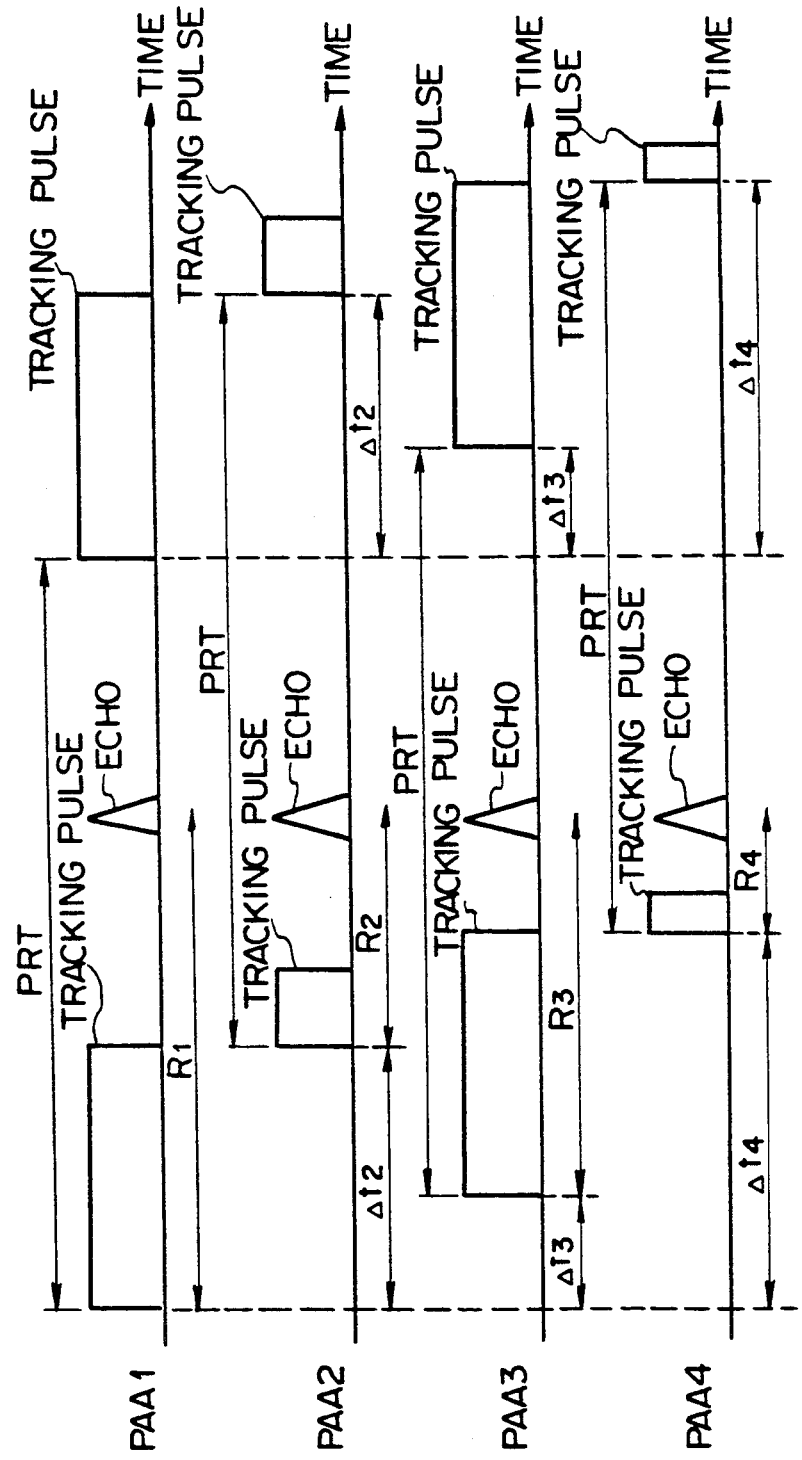
FIG. 5 shows an example of transmission timings allotted to phased array antennas in the beam management method according to the present invention.

In other words, the times when PAA1-PAA4 transmit the tracking beams to the targets and the times when these PAAs receive the echo signals reflected from the targets are determined such that transmission and reception do not occur at the same time. FIG. 5 shows an example of how those times are determined, allotted to the respective PAAs and arranged.

As can be understood from this figure, the pulses are transmitted from the PAA1, PAA2, PAA3 and PAA4 at such timings that the echo signals reflected from the targets are received at the time determined by the maximum range $R_1$.

In the step IV, the searching beam position is calculated for each PAA, and then, in a step V, the timings for radiating the searching and tracking beams are allotted to the respective PAAs. Finally, in the step VI, the BSCs connected to the respective PAAs are driven simultaneously to calculate amounts of phase shift to be set in the corresponding PAAs.

Figure 6:
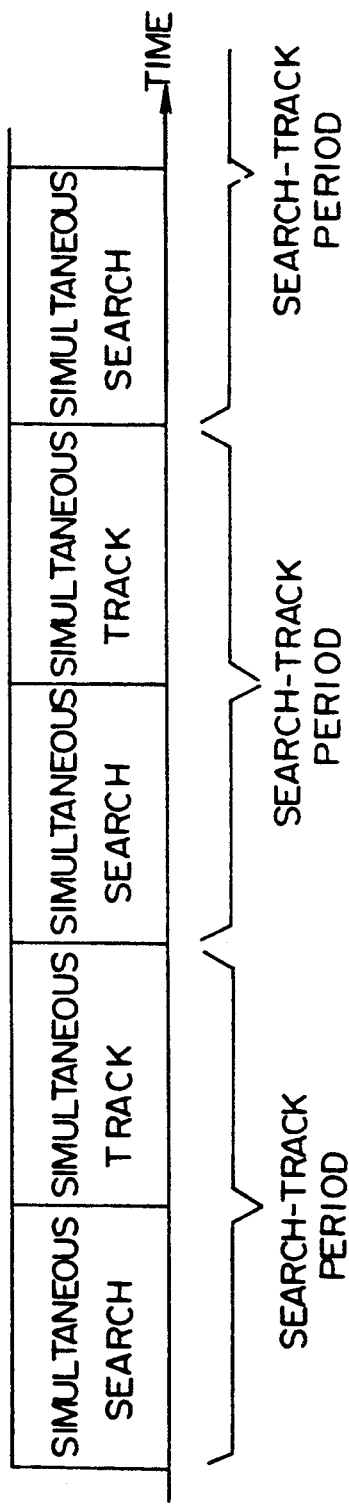
FIG. 6 shows a sequence of searching and tracking operations performed in the beam management method according to the present invention.
Figure 7:
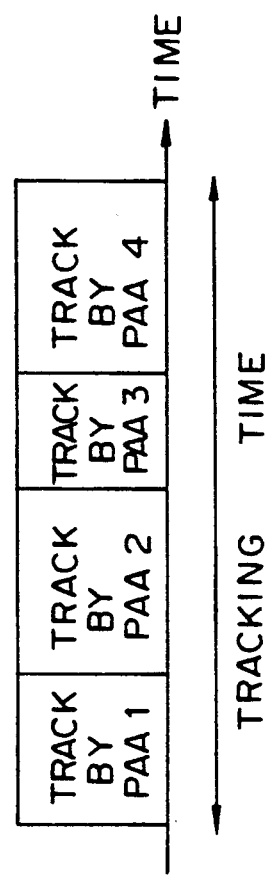
FIG. 7 shows an example of the order of tracking operations performed in one tracking period shown in FIG. 6.

By effecting such a beam management as described above, it is possible to arrange the search and tracking timings such that a simultaneous search by the PAAs and a simultaneous tracking by the PAAs are alternatingly performed, as shown in FIG. 6. In a simultaneous-tracking period, assuming that there are four different PRTs denoted as PRT1, PRT2 PRT3 and PRT4, the tracking beams are radiated from the PAAs in the order from PRT1 to PRT4 in a time-division-multiplexed manner, as shown in FIG. 7. More specifically, the PAAs having the pulse repetition rate PRT1 first radiate their tracking beams, followed by the radiation from PAAs having PRT2, followed by the radiation from the PAAs having PRT3, followed by the radiation from the PAAs having PRT4.

FIG. 8 shows the construction of an embodiment of a radar system according to the present invention. This figure shows a phased array radar having four PAAs as an example. A PAA 1 is connected to a TR switch 5 which is connected to a transmitter 9 and a receiver 13. A PAA 2 is connected to TR switch 6 which is connected to a transmitter 10 and a receiver 14. A PAA 3 is connected to a TR switch 7 which is connected to a transmitter 11 and a receiver 15. A PAA 4 is connected to a TR switch 8 which is connected to a transmitter 12 and a receiver 16. Those receivers 13-16 are respectively connected to input terminals of corresponding tracking computers 17, 18, 19 and 20.

Output terminals of the tracking computers 17-20 are connected to input terminals of a PRT selecting computer 21, output terminals of which are connected to input terminals of corresponding PRT timing computers 22, 23 and 24. In this example, three kinds of pulses having different PRTs are transmitted from the PAAs 1-4 and this is why three PRT timing computers 22-24 are provided. Output terminals of the PRT timing computers 22-24 are connected to input terminals of a scheduler 25. A searching beam position computer 26 is also connected to another input terminal of the scheduler 25. An output terminal of the scheduler 25 is connected to the transmitters 9-12 and the remaining output terminals of the scheduler 25 are connected to input terminals of corresponding BSCs 27, 28, 29 and 30 output terminals of which are connected to the corresponding PAAs 1-4.

In such a phased array radar system as constructed above, pulses having the same PRT and width are transmitted at a time by the transmitters 9-12. Those pulses are reflected by targets, received by the PAAs 1-4 and fed to the tracking computers 17-20 where the received echo pulses are processed for such tracking computation as made in the prior art to obtain the parameters of the tracked targets (ranges, transmission pulse widths, PRTs and the like). The obtained parameters are collected by the PRT selecting computer 21 which divides the parameters into three groups on the basis of the three kinds of PRTs. As a result, the PAAs corresponding to the same PRT make the same group, then, the parameters in the first, second and third groups are supplied to the PRT timing computers 22-24, respectively, and the transmission timings are determined using the ranges of the tracked targets relative to the maximum target range.

These determined transmission timings and the searching beam positions calculated in the searching beam position computer 26 are combined in the scheduler 25 to enable determination of a time arrangement for the target search and tracking performed by the respective PAAs 1-4. In accordance with the determined time arrangement, the scheduler 25 drives the BSCs 27-30 and the transmitters 9-12 simultaneously.

The present invention has been described in detail with particular reference to a certain embodiment thereof, but it is understood that variations and modifications can be effected within the spirit and scope of the present invention.

What is claimed is:

1. A method of managing beams transmitted and received by a radar comprising a plurality of phased array antenna apparatuses, said method comprising the steps of:
  in a search mode, causing the phased array antenna apparatuses to form searching beams synchronously to thereby avoid mutual electrical wave interference between the phased array antenna apparatuses; and
  in a tracking mode, dividing targets tracked by the phased array antenna apparatuses to a plurality of groups on the basis of pulse repetition rate, and then calculating, for the respective divided groups, transmission timings of tracking pulses to be sent from the phased array antenna apparatuses using ranges of the targets belonging to the respective groups so that one phased array antenna apparatus does not transmit the tracking pulse at the time when another phased array antenna apparatus is in a receiving operation, thereby avoiding interference between the phased array antenna apparatuses and enabling the simultaneous usage thereof.

2. A method of managing beams transmitted and received by a radar comprising a plurality of phased array antenna apparatuses disposed closely, said method comprising the steps of:
  (1) in a search mode, (a) transmitting pulses having the same characteristic from the respective phased array antenna apparatuses in the radar simultaneously, and (b) receiving echoes from the targets by the phased array antenna apparatuses;
  (2) then, in a tracking mode, (a) analyzing parameters of the targets from the received echoes; (b) dividing targets tracked by the phased array antenna apparatuses to groups on the basis of at least one of the analyzed parameters; (c) allotting transmission timings to the phased array antenna apparatuses tracking the targets belonging to any one of the divided groups by using the ranges of the targets of that group so that transmitting and receiving operations do not occur at the same time in the phased array antenna apparatuses corresponding to that group; and (d) driving the phased array antenna apparatuses corresponding to that group in accordance with the allotted timings; and
  (3) repeating the steps of (1) and (2).

3. The method as set forth in claim 2 wherein the same characteristic is a pulse width and a pulse repetition rate.

4. The method as set forth in claim 2 wherein at least one of the analyzed parameters is a pulse repetition rate.

5. The method as set forth in claim 2 wherein the step (2) further comprises, between the steps of (c) and (d), the steps of:
  (e) calculating positions of the searching beams to be radiated from the respective phased array antenna apparatuses; and
  (f) allotting timings for transmitting the searching and the tracking pulses to the respective phased array antennas.

6. A radar system for searching and tracking targets, comprising:
  a plurality of phased array antennas disposed closely;
  transmitting means provided in correspondence to the phased array antennas;
  receiving means provided in correspondence to the phased array antennas for receiving echo signals from the searched targets to analyze parameters of the targets from the received echo signals;
  a first means responsive to the analyzed parameters for dividing the targets into a plurality of groups on the basis of at least one of the analyzed parameters;
  a second means for allotting, for each divided group, transmission timings of tracking pulses to the phased array antennas corresponding to that group using the range of the targets belonging to that group so that transmitting and receiving operations do not occur at the same time in that group;
  a third means for causing the transmitting means to transmit searching pulses having the same characteristic at the same time in the search mode and for causing the transmitting means to transmit tracking pulses in response to the allotted transmission timings in the tracking mode; and
  a fourth means responsive to the third means for causing the phased array antennas to form searching and tracking beams in predetermined directions.

7. The radar system as set forth in claim 6 wherein the same characteristic is pulse width and a pulse repetition rate.

8. The radar system as set forth in claim 6 wherein the at least one of the analyzed parameters is a pulse repetition rate.

9. A multifunction phased array radar including a plurality of closely disposed phased array antennas for performing searching and tracking targets, the radar comprising:
  transmitters provided in correspondence to the phased array antennas for transmitting searching and tracking pulses;
  receivers provided in correspondence to the phased array antennas to receive echo signals from the targets;
  tracking computing means responsive to the corresponding receivers for analyzing parameters of the targets tracked by the phased array antennas on the basis of the received echo signals;
  a grouping computing means responsive to the tracking computing means for dividing the targets into a plurality of groups on the basis of pulse repetition rates;
  timing computing means provided in correspondence to the respective divided groups to compute transmission timings to send the tracking pulses from the transmitters, using ranges of the targets belonging to the respective groups, so that transmitting and receiving operations do not occur at the same time in the phased array antennas corresponding to any one of the divided groups;

a position computing means for computing the positions of the searching beams to be formed by the respective phased array antennas in the search mode;

a scheduler means responsive to the timing computing means and the position computing means for causing the transmitters to operate to send the searching pulses simultaneously in the search mode and for causing the transmitters corresponding to the respective groups to operate to send the tracking pulses at the timings determined by the corresponding timing computing means and in the order of the groups; and beam scanning computing means provided in correspondence to the divided groups for causing the phased array antennas corresponding to the respective groups to form beams in predetermined directions.

10. A radar system for sensing distant targets, comprising:

a first plurality of phased array antennas;

a like plurality of switching means, each of said switching means being connected to a respective phased array antenna;

a like plurality of transmitters, each of said transmitters having an output connected to an input of a respective switching means;

a like plurality of receivers, each of said receivers having an input connected to a respective one of said switching means, whereby said switching means is for switching between utilization of said phased array antennas by said transmitters and by said receivers;

a like plurality of tracking means, each having an input connected to a respective output of a respective said receiver, for calculating target parameters of a target sensed by said respective phased array antenna and producing parameter signals indicative thereof;

a like plurality of beam scan calculating means, each having an output connected to an input of a respective phased array antenna, for individually phase shifting said phased array antennas;

selecting means responsive to parameter signals from said plurality of tracking means for dividing the target parameter signals into a predetermined number of groups based on pulse repetition rate;

a plurality of timing means, one for each of said predetermined number of groups, for determining transmission timing based on the ranges of the tracked targets relative to maximum target range and producing transmission timing signals respectively indicative thereof;

beam position determining means for producing a plurality of searching beam position signals respectively indicative of desired searching beam positions for phased array antenna output; and scheduling means, receiving the transmission timing signals from said plurality of timing means and the searching beam position signals from said beam position determining means, for controlling operation of said transmitters and said plurality of beam scan calculating means.

* * * * *